(12) United States Patent
Magrath et al.

(10) Patent No.: US 12,131,251 B2
(45) Date of Patent: Oct. 29, 2024

(54) NEURONS FOR ARTIFICIAL NEURAL NETWORKS

(71) Applicant: Cirrus Logic International Semiconductor Ltd., Edinburgh (GB)

(72) Inventors: Anthony Magrath, Edinburgh (GB); John Paul Lesso, Edinburgh (GB)

(73) Assignee: Cirrus Logic Inc., Austin, TX (US)

( * ) Notice: Subject to any disclaimer, the term of this patent is extended or adjusted under 35 U.S.C. 154(b) by 1292 days.

(21) Appl. No.: 16/358,278

(22) Filed: Mar. 19, 2019

(65) Prior Publication Data

US 2020/0302282 A1 Sep. 24, 2020

(51) Int. Cl.
*G06N 3/04* (2023.01)
*G06F 17/16* (2006.01)
*G06N 3/065* (2023.01)

(52) U.S. Cl.
CPC ............ *G06N 3/065* (2023.01); *G06F 17/16* (2013.01); *G06N 3/04* (2013.01)

(58) Field of Classification Search
None
See application file for complete search history.

(56) References Cited

U.S. PATENT DOCUMENTS

| | | | | |
|---|---|---|---|---|
| 5,097,491 A * | 3/1992 | Hall | ...................... | H03K 23/005 377/106 |
| 6,700,586 B1 * | 3/2004 | Demers | .................... | G06T 15/04 345/474 |
| 8,477,879 B2 * | 7/2013 | Oettinger | ............ | H04L 27/2338 375/333 |
| 10,740,434 B1 * | 8/2020 | Duong | ................... | G06F 7/5443 |
| 11,170,289 B1 * | 11/2021 | Duong | ................... | G06F 7/5443 |
| 11,531,727 B1 * | 12/2022 | Ko | ............................ | G06F 5/01 |
| 2003/0060939 A1 * | 3/2003 | Jones | ...................... | G05B 13/04 701/4 |
| 2020/0005125 A1 * | 1/2020 | Venkataramani | .... | G06N 3/0481 |
| 2020/0150926 A1 * | 5/2020 | Connor | .................... | G06F 7/523 |

FOREIGN PATENT DOCUMENTS

WO WO-9314461 A1 * 7/1993 ............. G06N 3/063

OTHER PUBLICATIONS

Hu et al., "Dot-Product Engine for Neuromorphic Computing, Programming 1T1M Crossbar to Accelerate Matrix-Vector Multiplication", (2016) (Year: 2016).*

* cited by examiner

*Primary Examiner* — Alexey Shmatov
*Assistant Examiner* — Beatriz Ramirez Bravo
(74) *Attorney, Agent, or Firm* — Jackson Walker L.L.P.

(57) ABSTRACT

The present disclosure relates to a neuron for an artificial neural network, the neuron comprising: a first dot product engine and a second dot product engine. The first dot product engine is operative to: receive a first set of weights; receive a set of inputs; and calculate the dot product of the set of inputs and the first set of weights to generate a first dot product engine output. The second dot product engine is operative to: receive a second set of weights; receive the set of inputs; and calculate the dot product of the set of inputs and the second set of weights to generate a second dot product engine output. The neuron further comprises a combiner operative to combine the first dot product engine output and the second dot product engine output to generate a combined output, and an activation function module arranged to apply an activation function to the combined output to generate a neuron output.

16 Claims, 11 Drawing Sheets

NEURONS FOR ARTIFICIAL NEURAL NETWORKS

FIELD OF THE INVENTION

The present disclosure relates to the field of artificial neural networks.

BACKGROUND

In simplistic terms, an artificial neural network includes an input layer of nodes or neurons, an output layer of nodes or neurons and, optionally, one or more layers (often referred to as "hidden layers") of nodes or neurons intermediate the input layer and the output layer. Each layer is connected to its successor layer by connections between the nodes of the layers that transfer data from a node of a layer to a node of the successor layer.

Each node or neuron of a layer typically has multiple inputs, and a weight is assigned to each input of each node in a learning or training stage. During this learning or training stage, known training data is supplied to a layer of the neural network and individual neurons of the layer assign weights to their inputs based on the task being performed. By comparing the resultant outputs with the known training data, and repeating over a series of iterations, the neural network learns the optimum weights to assign to the inputs of the neurons for the task being performed.

During subsequent use of the neural network, operational input data is supplied to the input layer of the neural network. Data applied to a neuron of the input layer is weighted according to the weights assigned to the inputs of the neuron—i.e. the neuron applies the weight assigned to each of its inputs to the data received at the respective inputs. The neuron sums the weighted input data and performs a non-linear activation function on the sum of the weighted input data to generate an output data value, which is transmitted to one or more neurons of the next layer of the neural network, which may be an output layer or an intermediate layer. The use of a trained neural network to apply weights to operational input data is known as inference.

Traditionally the training and inference stages have been performed by centralised servers or "in the cloud", receiving inputs from and providing resultant outputs to so-called "edge" devices, e.g. mobile phones, tablet computers, "smart" devices etc. However, increasingly there is a drive to provide neural nets for inference locally in such devices, which may receive trained weights from training processes performed remotely.

In addition, inference systems are increasingly intended for use in always-on applications, e.g. always-on audio monitoring or image processing systems.

Additionally, there is increasing interest in on-device learning, in which an edge device receives a current neural net model from a provider and performs additional training of the received model itself, using data stored locally on the edge device.

The trend towards providing local neural nets and inference systems within edge devices is driving requirements for reduced power consumption and increased flexibility in such neural networks and inference systems.

SUMMARY

According to a first aspect, the invention provides a neuron for an artificial neural network, the neuron comprising: a first dot product engine operative to: receive a first set of weights; receive a set of inputs; and calculate the dot product of the set of inputs and the first set of weights to generate a first dot product engine output; a second dot product engine operative to: receive a second set of weights; receive the set of inputs; and calculate the dot product of the set of inputs and the second set of weights to generate a second dot product engine output; and a combiner operative to combine the first dot product engine output and the second dot product engine output to generate a combined output, the neuron further comprising an activation function module arranged to apply an activation function to the combined output to generate a neuron output.

The second dot product engine may be selectively operable.

For example, the second dot product engine may be selectively operable based on the first dot product engine output.

The neuron may further comprise a processing unit operable to process the first dot product engine output and to output an enable signal to the second dot product engine if the processing unit determines, based on the processing of the first dot product engine output, that the second dot product engine should be enabled.

The neuron according may further comprise a buffer for receiving the first dot product engine output, and the processing system may be configured to receive the first dot product engine output from the buffer.

Alternatively, the combiner may be selectively operable, and the processing unit may be operable to output an enable signal to the combiner if the processing unit determines, based on the processing of the first dot product engine output, that the second dot product engine should be enabled.

The first and second dot product engines may be analog dot product engines.

Alternatively, the first dot product engine may be an analog dot product engine and the second dot product engine may be a digital dot product engine.

The neuron may further comprise a process control monitor operative to monitor the first dot product engine output and the second dot product engine output and to apply a gain to one or both of the first dot product engine output and the second dot product engine output to compensate for gain variation or difference between the first dot product engine output and the second dot product engine output.

The first dot product engine may have a first output range and the second dot product engine may have a second output range, wherein the second output range is larger than the first output range.

The first and second sets of weights may be derived from a master set of weights intended to be applied to the inputs, wherein each weight of the first set of weights represents one or more most significant bits (MSBs) of a corresponding weight of the master set of weights and each weight of the second set of weights represents one or more least significant bits (LSBs) of the corresponding weight of the master set of weights.

The second dot product engine may be selectively operable to calculate the dot product of one or more most significant bits of each input of the set of inputs and the second set of weights to generate the second dot product engine output.

The second dot product engine may be configured to implement a trimming function or a calibration function for the first dot product engine.

The weights of the second set of weights may have a different quantisation level than the weights of the first set of weights.

The second dot product engine may be configured to correct quantisation error of the first set of weights used by the first dot product engine.

The neuron may further comprise one or more memories for storing the first and second sets of weights.

The first dot product engine or the second dot product engine may comprise an array of memristors.

The first and second dot product engines are preferably structurally or functionally different from each other.

The first and second dot product engines may be vector dot product engines.

According to a second aspect, the invention provides a neuron for an artificial neural network, the neuron comprising: an analog dot product engine operative to: receive a first set of weights; receive a set of inputs; and calculate the dot product of the set of inputs and the first set of weights to generate an analog dot product engine output; a digital dot product engine operative to: receive a second set of weights; receive the set of inputs; and calculate the dot product of the set of inputs and the second set of weights to generate a digital dot product engine output; and a combiner operative to combine the analog dot product engine output and the digital dot product engine output to generate a combined output, the neuron further comprising an activation function module arranged to apply an activation function to the combined output to generate a neuron output.

According to a third aspect, the invention provides a neuron for an artificial neural network, the neuron comprising: a first dot product engine operative to: receive a first set of weights, each weight of the first set of weights having a first quantisation level; receive a set of inputs; and calculate the dot product of the set of inputs and the first set of weights to generate a first dot product engine output; a second dot product engine operative to: receive a second set of weights, each weight of the second set of weights having a second quantisation level that is different than the first quantisation level; receive the set of inputs; and calculate the dot product of the set of inputs and the second set of weights to generate a second output; and a combiner operative to combine the first dot product engine output and the second dot product engine output to generate a combined output, the neuron further comprising an activation function module arranged to apply an activation function to the combined output to generate a neuron output.

According to a third aspect, the invention provides an integrated circuit comprising a neuron according to first, second or third aspect.

According to a fourth aspect, the invention provides a device comprising an integrated circuit according to the third aspect.

The device may be a mobile telephone, a tablet or laptop computer or an Internet of Things (IoT) device, for example.

According to a fifth aspect, the invention provides an artificial neural network comprising a plurality of neurons according to the first, second or third aspect.

According to a sixth aspect, the invention provides an artificial neural network system comprising: a first plurality of neural network computing tiles having a first resolution; a second plurality of neural network computing tiles having a second resolution, wherein the second resolution is different from the first resolution; a configurable data bus arranged to selectively couple computing tiles of the first plurality with computing tiles of the second plurality of computing tiles; and a controller arranged to control switching of the configurable data bus such that the system is arranged to implement neural network computing of configurable resolution.

The neural network computing tiles may comprise Vector Dot Product (VDP) computing units.

The first plurality of neural network computing tiles may be arranged in a first array, and the second plurality of neural network computing tiles may be arranged in a second array.

One of the first and second arrays may comprises an analog computing array, and the other of the first and second arrays may comprise a digital computing array.

The artificial neural network system may comprise a combiner coupled with the data bus to combine the output of at least one tile of the first plurality and at least one tile of the second plurality.

BRIEF DESCRIPTION OF THE DRAWINGS

Embodiments of the invention will now be described, strictly by way of example only, with reference to the accompanying drawings, of which.

DETAILED DESCRIPTION

Figure 1:
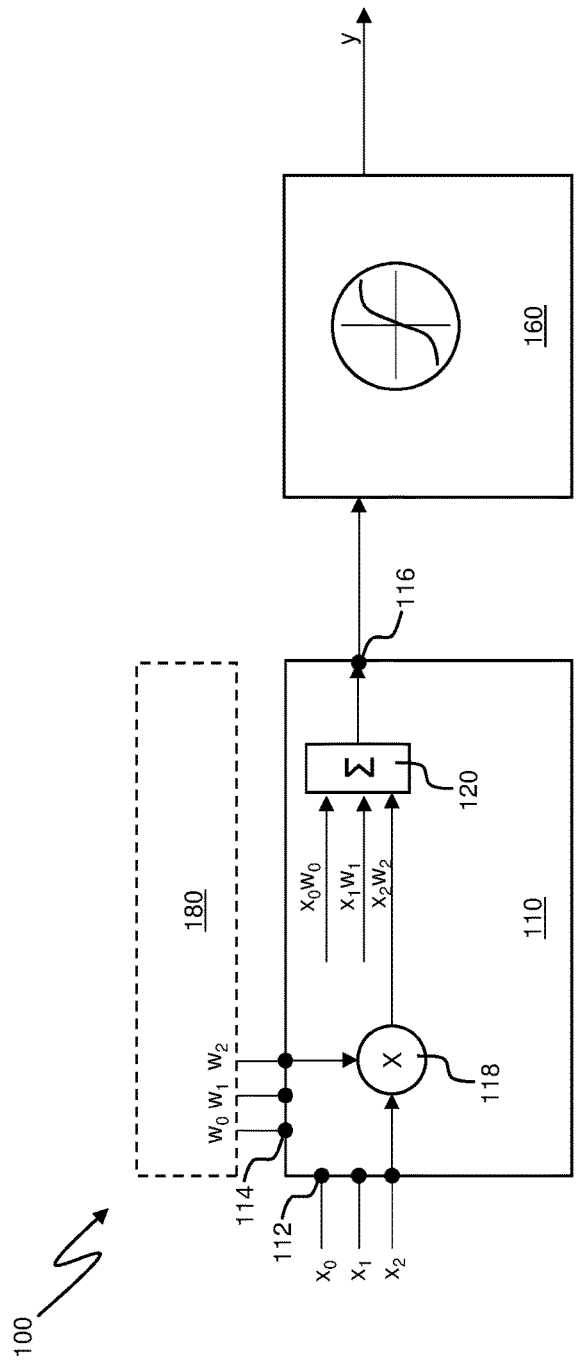
FIG. 1 is simplified schematic representation of a neuron for an artificial neural network.

Referring first to FIG. 1, a neuron for an artificial neural network (ANN) is shown generally at 100, and comprises a dot product engine 110 and an activation function unit 160.

A neuron of a neural network can be modelled, in part, by a vector multiplication operation, multiplying a vector of input values (representing the inputs to the neuron) by a vector of weights or coefficients (representing the weights applied by the neuron to its inputs) to generate a vector of output values (representing the results of the multiplication of each input value with the corresponding weight value).

The dot product engine 110 of FIG. 1 is configured to calculate the dot product of a plurality (in this example three) of input signals and a plurality (in this example three) of weight signals, by multiplying each input with a corresponding weight and summing the results of the multiplication to generate a single output value. Thus the dot product engine implements part of the functionality of a neuron of a neural network.

To this end, the dot product engine 110 has a plurality of parallel data input terminals 112 for receiving input data signals, a plurality of weight input terminals 114 for receiving weight data signals, and a data output terminal 116 for outputting a result of a calculation of the dot product of the input data signals and the weight data signals.

The dot product engine 110 further includes a plurality of computation elements 118 (of which, for the sake of clarity, only one is shown in FIG. 1) and a summation unit 120. The computation elements 118 may be digital computation elements or analog computation elements. In the case where the computation elements 118 are digital computation elements, the dot product engine 110 may be referred to as a digital dot product engine, whereas if the computation elements 118 are analog computation elements the dot product engine 110 may be referred to as an analog dot product engine.

In one example, the computation elements 118 may be based on memristors, in which case the weight data signals received by the dot product engine 110 via the weight input terminals 114 may be, for example, signals (e.g. currents) that are used to program the computation elements 118 with weight data.

Where the computation elements 118 are digital computation elements, the weight data signals may be received from a memory 180, external to the dot product engine 110, which stores weight values. It will be understood the memory may be physically embedded or there may be some local latched copy of the weight data.

In use of the system 100, input data signals $x_0$, $x_1$, $x_2$ are received at the data input terminals 112 of the dot product engine 110. A computation element 118 of the dot product engine 110 multiplies each received input signal $x_0$, $x_1$, $x_2$ with a corresponding weight $w_0$, $w_1$, $w_2$ and outputs an output signal representing the result of the multiplication to the summation unit 120. For example, as shown in FIG. 1, a computation element 118 of the dot product engine 110 calculates the product of input signal $x_2$ and weight $w_2$ and outputs a signal representing the result $x_2w_2$ of this multiplication to the summation unit 120.

The summation unit 120 sums the results $x_0w_0$, $x_1w_1$, $x_2w_2$ of the multiplication operations performed by the computation elements 118 and outputs a dot product output signal representing the sum of the multiplication operations to the non-linear activation function 160, via the output terminal 116 of the dot product engine 110.

The non-linear activation function 160 performs a non-linear activation function on the dot product output signal. For example, the non-linear activation function unit 160 may compare the magnitude of the dot product output signal to a threshold, and output an output signal y having a magnitude equal to that of the dot product output signal if the magnitude of the dot product output signal meets or exceeds the threshold. If the magnitude of the dot product output signal is below the threshold, the non-linear activation function unit 160 may output a zero or a signal having some other constant magnitude. It will be understood that this is a simple example of a non-linear activation function, and that alternative non-linear functions may be used as required by the particular circumstances and application of the net in which the neuron 100 is used. For example, the non-linear activation function may include or be based on a non-linear function such as a cube, square, ReLU, sigmoid, tanh. Other suitable non-linear functions will be familiar to those skilled in the art.

As discussed above, the dot product engine 110 of FIG. 1 is configured to implement the multiplication of an input vector X by a weight vector W to generate an output vector Y, i.e. the dot product engine 110 implements the vector calculation Y=WX.

Figure 2:
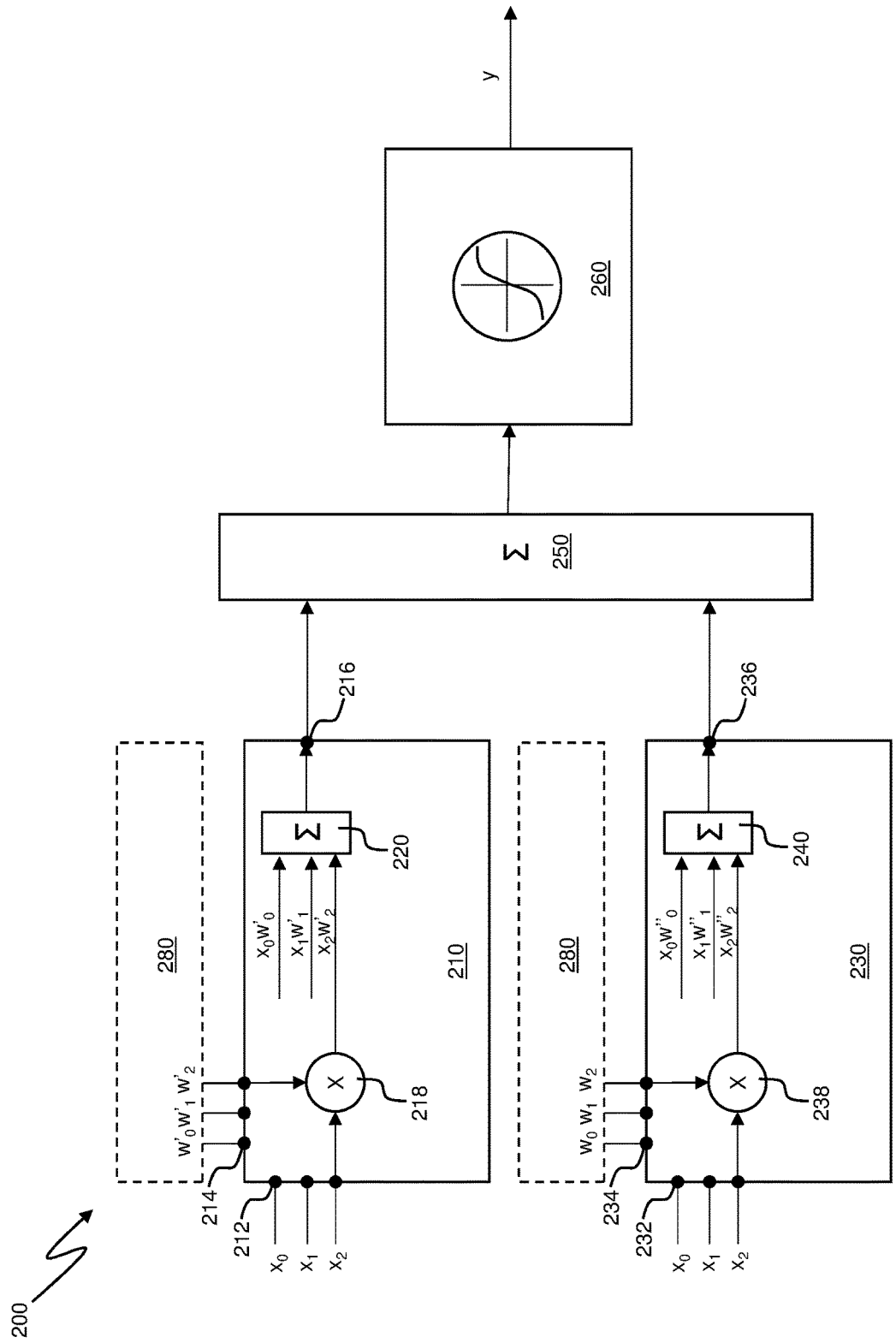
FIG. 2 is a schematic representation of an example of an alternative neuron for an artificial neural network.

An alternative neuron for an artificial neural network is shown generally at 200 in FIG. 2. The alternative neuron 200 provides a greater degree of flexibility than the neuron 100 of FIG. 1, as will become apparent from the following description, through the use of separate and distinct first and second dot product engines which calculate the dot products of a set of inputs with respective first and second sets of weights, as will be described in detail below. The first and second sets of weights are based on or derived from a set of weights W intended to be applied to the set of inputs. For example, each weight of a first set of weights W' to be used by the first dot product engine may represent the most significant bits (MSBs) of the corresponding weight of the set of weights W, whilst each weight of a second set of weights W" to be used by the second dot product engine may represent the least significant bits (LSBs) of the corresponding weight of the set of weights W.

The neuron 200 includes a first dot product engine 210, a second dot product engine 230, a combiner 250 and a non-linear activation function unit 260. The second dot product engine 230 is separate and distinct from the first dot product engine 210 in the sense that it is structurally or functionally different than the first dot product engine. For example, the first dot product engine 210 may be an analog dot product engine and the second dot product engine 230 may be a digital dot product engine, in which case the first dot product engine 210 and the second dot product engine 230 are structurally different, or the first and second dot product engines 210, 230 may be configured to perform their respective computations using weights that have different levels of quantisation, in which case the first dot product engine 210 and the second dot product engine 230 are functionally different. Alternatively, the first and second dot product engines 210,230 may be analog implementations different in function or structure, e.g. chosen between a memristor-based architecture or a switched-cap-based architecture or a floating-gate flash architecture or a programmed weight current source-based architecture. The selection of the particular architecture may be made to optimise area/power/accuracy. Different engines may enable appropriate trade-offs in power consumption, area, accuracy.

The first dot product engine 210 is configured to calculate the dot product of a plurality (in this example three) of input signals and a plurality (in this example three) of weight signals, by multiplying each input with a corresponding weight and summing the results of the multiplication to generate a single output value.

To this end, the first dot product engine 210 has a plurality of parallel data input terminals 212 for receiving input data signals, a plurality of weight input terminals 214 for receiving weight data signals, and a data output terminal 216 for outputting a result of a calculation of the dot product of the input data signals and the weight data signals.

The first dot product engine 210 further includes a plurality of computation elements 218 (of which, for the sake of clarity, only one is shown in FIG. 2). For example, the first dot product engine 210 may comprise an array of computation elements 218. The computation elements 218 may be digital computation elements or analog computation elements. In the case where the computation elements 218 are digital computation elements, the first dot product engine 210 may be referred to as a digital dot product engine, whereas if the computation elements 218 are analog computation elements the dot product engine 210 may be referred to as an analog dot product engine.

Similarly, the second dot product engine 230 is configured to calculate the dot product of a plurality (in this example three) of input signals and a plurality (in this example three) of weight signals, by multiplying each input with a corresponding weight and summing the results of the multiplication to generate a single output value.

The second dot product engine 230 has a plurality of parallel data input terminals 233 for receiving input data signals, a plurality of weight input terminals 234 for receiving weight data signals, and a data output terminal 236 for outputting a result of a calculation of the dot product of the input data signals and the weight data signals.

The second dot product engine 230 further includes a plurality of computation elements 238 (of which, for the sake of clarity, only one is shown in FIG. 2). For example, the second dot product engine 230 may comprise an array of computation elements 238. The computation elements 238 may be digital computation elements or analog computation elements. In the case where the computation elements 238 are digital computation elements, the second dot product engine 230 may be referred to as a digital dot product engine, whereas if the computation elements 238 are analog computation elements the dot product engine 230 may be referred to as an analog dot product engine.

In one example, the computation elements 218, 238 may be based on memristors (e.g. the computation elements 218, 238 may each comprise a single memristor or a plurality of memristors connected in series or parallel, or a combination of series and parallel connected memristors), in which case the weight data signals received by the first and second dot product engines 210, 230 via the weight input terminals 214, 234 may be, for example, signals (e.g. currents) that are used to program the computation elements 218, 238 with weight data (e.g. to program the resistance of a memristor).

Where the computation elements 218, 238 are digital computation elements, the weight data signals may be received from a memory 280, external to the first and second dot product engines 210, 230, which stores weight values.

In one example, described in more detail below, the computation elements 218 of the first dot product engine 210 are analog computation elements, such that the first dot product engine 210 is an analog dot product engine, whilst the computation elements 238 of the second dot product engine 230 are digital computation elements, such that the second dot product engine 230 is a digital dot product engine 230.

In use of the neuron 200, input data signals $x_0$, $x_1$, $x_2$ are received at the data input terminals 212 of the first dot product engine 210. Computation elements 218 of the first dot product engine 210 multiply each received input signal $x_0$, $x_1$, $x_2$ with a corresponding weight $w'_0$, $w'_1$, $w'_2$ of a first set of weights, and outputs output signals representing the results of the multiplications to the summation unit 220. For example, as shown in FIG. 2, a computation element 218 of the first dot product engine 210 multiplies input signal $x_2$ by weight $w'_2$ and outputs a signal representing the result $x_2 w'_2$ of this multiplication to the summation unit 220. The summation unit 220 sums the results $x_0 w'_0$, $x_1 w'_1$, $x_2 w'_2$ of the multiplication operations performed by the computation elements 218 and outputs a first dot product output signal representing the sum of the multiplication operations to the combiner 250, via the output terminal 216 of the first dot product engine 210.

The same data signals $x_0$, $x_1$, $x_2$ are received at the data input terminals 232 of the second dot product engine 230. Computation elements 238 of the second dot product engine 230 multiply each received input signal $x_0$, $x_1$, $x_2$ with a corresponding weight $w''_0$, $w''_1$, $w''_2$ of a second set of weights, and output signals representing the results of the multiplications to the summation unit 240. For example, as shown in FIG. 2, a computation element 238 of the second dot product engine 230 multiplies input signal $x_2$ by weight $w''_2$ and outputs a signal representing the result $x_2 w''_2$ of this multiplication to the summation unit 240. The summation unit 240 sums the results $x_0 w''_0$, $x_1 w''_1$, $x_2 w''_2$ of the multiplication operations performed by the computation elements 238 and outputs a second dot product output signal representing the sum of the multiplication operations to the combiner 250, via the output terminal 236 of the first dot product engine 230.

The combiner 250 receives the first and second dot product output signals from the first and second dot product engines 210, 230 and combines them to generate a combined dot product output signal, which it outputs to the non-linear activation function 260. The combiner 250 may comprise an analog-to-digital converter (ADC), for example if one engine is analog providing an analog output, with the other engine being digital providing a digital output, where an ADC may be used to allow for the outputs to be combined.

The non-linear activation function unit 260 performs a non-linear activation function on the combined dot product output signal. For example, the non-linear activation function unit 260 may compare the magnitude of the combined dot product output signal to a threshold, and output an output signal y having a magnitude equal to that of the combined dot product output signal if the magnitude of the combined dot product output signal meets or exceeds the threshold. If the magnitude of the combined dot product output signal is below the threshold, the non-linear activation function unit 260 may output a zero or a signal having some other constant magnitude. It will be understood that this is a simple example of a non-linear activation function, and that alternative non-linear functions may be used as required by the particular circumstances and application of the net in which the neuron 200 is used. For example, the non-linear activation function may include or be based on a non-linear function such as a cube, square, ReLU, sigmoid, tanh. Other suitable non-linear functions will be familiar to those skilled in the art.

The neuron 200 of FIG. 2 provides greater flexibility than the neuron 100 of FIG. 1.

For example, the neuron 200 may allow one of the first or second dot product engines 210, 230 to be selectively enabled and disabled, to accommodate different power consumption and/or accuracy requirements. For example, one of the first or second dot product engines 210, 230 may be disabled to reduce power consumption at the cost of reduced computational accuracy.

Alternatively or additionally, the second dot product engine 230 may be configured to implement a trimming or fine tuning function, providing fine adjustments to the results of computations performed by the first dot product engine 210.

Alternatively or additionally, the second dot product engine 230 may be configured to implement a calibration function, providing adjustments to the results of computations performed by the first dot product engine 210, for example to compensate for variations in the values of the weights over time.

The first and second dot product engines 210, 230 may be configured to perform their respective computations on weight data having different levels of quantisation.

For example, the first dot product engine 210 may be configured to multiply the input signals $x_0$, $x_1$, $x_2$ by, say, 4-bit signals representing the weights $w'_0$, $w'_1$, $w'_2$ whilst the second dot product engine 230 may be configured to multiply the input signals $x_0$, $x_1$, $x_2$ by, say, 6-bit signals representing the weights $w''_0$, $w''_1$, $w''_2$. Thus in this example the computations performed by the second dot product engine 230 may have a higher range or degree of accuracy than those performed by the first dot product engine 210, such that the results of the computations performed by the first dot product engine 210 can be used to provide a coarse approximation of the desired output of the neuron 200 and the results of the computations performed by the second dot product engine 230 can be used to refine the coarse approximation provided by the first dot product engine 210. Of course, the roles of the first and second dot product engines 210, 230 in the above example may be reversed; the first dot product engine 210 may be configured to perform its computations using signals representing the weights $w'_0$, $w'_1$, $w'_2$ with higher quantisation levels than those of the signals representing the weights $w''_0$, $w''_1$, $w''_2$ used by the second dot product engine 230. For example, the first dot product engine 210 may be configured to multiply the input signals $x_0$, $x_1$, $x_2$ by, say, 6-bit signals representing the weights $w'_0$, $w'_1$, $w'_2$, whilst the second dot product engine 230 may be configured to multiply the input signals $x_0$, $x_1$, $x_2$ by, say, 4-bit signals representing the weights $w''_0$, $w''_1$, $w''_2$.

The first and second dot product engines 210, 230 may both be analog dot product engines, or may both be digital dot product engines. Alternatively, one of the first and second dot product engines 210, 230 may be an analog dot product engine and the other may be a digital dot product engine. For example, the first dot product engine 210 may be an analog dot product engine and the second dot product engine 230 may be a digital dot product engine.

Figure 3:
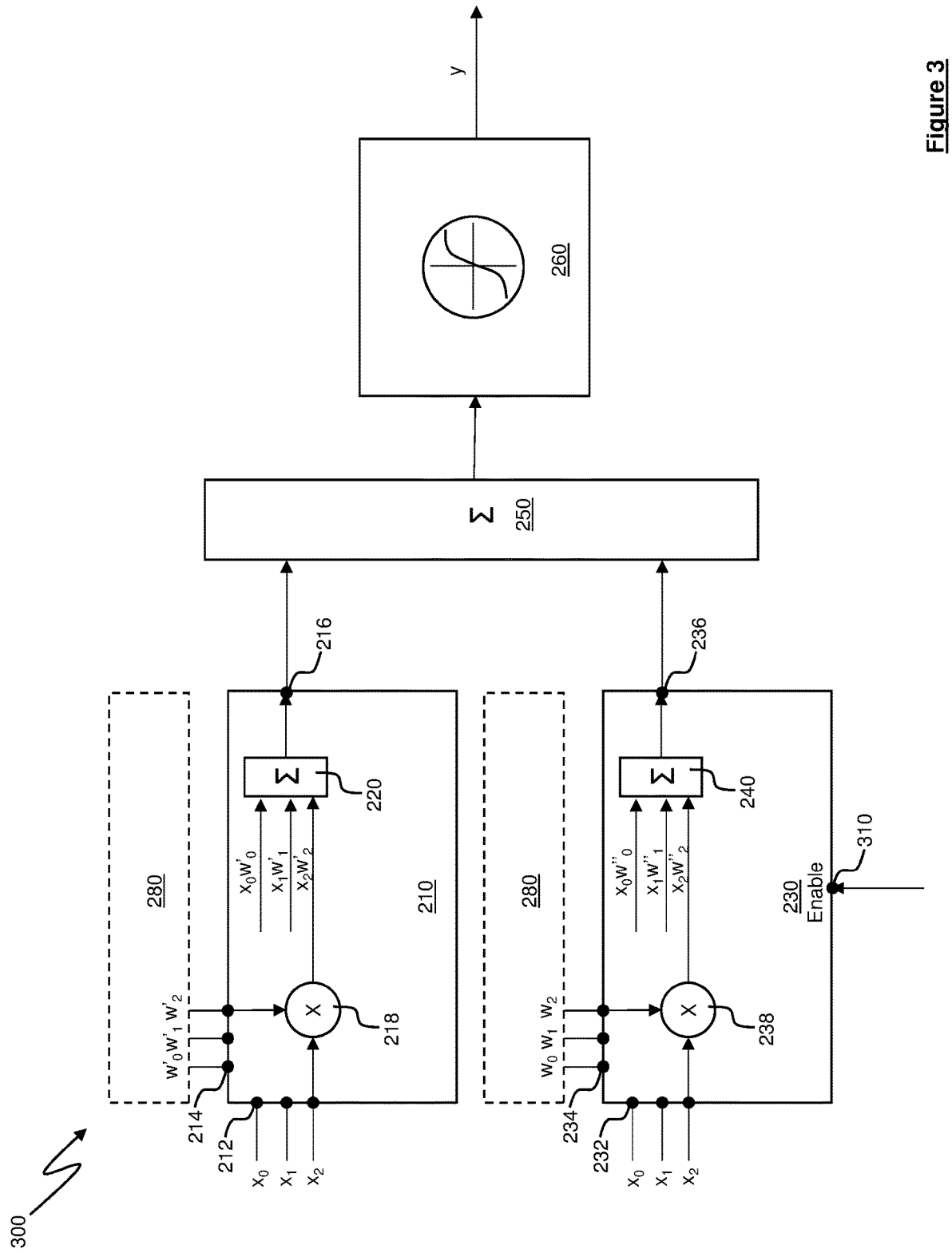
FIG. 3 is a schematic representation of a further example of an alternative neuron for an artificial neural network.

FIG. 3 is a schematic representation of a neuron in which a dot product engine can be selectively enabled and disabled. The neuron (shown generally at 300 in FIG. 3) is similar to the neuron 200 of FIG. 2, and thus like elements are denoted by like reference numerals. The neuron 300 of FIG. 3 differs from the neuron 200 of FIG. 2 in that the second dot product engine 230 includes an enable terminal 310 configured to receive an enable/disable signal. In response to receiving an enable signal at the enable terminal 310, the second dot product engine 230 may be enabled, whereas in response to receiving a disable signal at the enable terminal 310, the second dot product engine 230 may be disabled. When the second dot product engine 230 is enabled, the neuron 300 operates at maximum computational accuracy, but also at maximum power consumption, whereas when the second dot product engine 230 is disabled the computation accuracy of the neuron 300 is reduced, but its power consumption is also reduced, as the second dot product engine 230 consumes little or no power when it is disabled.

This arrangement enables the neuron 300 to be operated in different modes.

In a first mode, the first dot product engine 210 is enabled and calculates the dot product of the inputs $x_0$, $x_1$, $x_2$ and the first set of weights $w'_0$, $w'_1$, $w'_2$, whilst the second dot product engine 230 is also enabled and calculates the dot product of the inputs $x_0$, $x_1$, $x_2$ and the second set of weights $w'_0$, $w'_1$, $w'_2$. If the first set of weights is selected to represent the MSBs of a set of weights W intended to be applied to the set of inputs and the second set of weights is selected to represent the LSBs of the set of weights intended to be applied to the set of inputs, then the combined dot product output by the neuron 300 will be a high-accuracy representation of the dot product of the set of weights W and the set of input signals.

In a second mode, the first dot product engine 210 is enabled and calculates the dot product of the inputs $x_0$, $x_1$, $x_2$ and the first set of weights $w'_0$, $w'_1$, $w'_2$, whilst the second dot product engine 230 is disabled. Assuming that the first set of weights is selected to represent the MSBs of a set of weights W intended to be applied to the set of inputs and the second set of weights is selected to represent the LSBs of the set of weights intended to be applied to the set of inputs, then in this mode, the combined dot product output by the neuron 300 will be a less accurate representation of the dot product of the set of weights W and the set of input signals (because there is no contribution from the LSBs of the weights of the set of weights W), but the power consumed by the neuron 300 in generating the combined dot product output is reduced as compared to the first mode, since the second dot product engine 230 was disabled.

In a third mode, the first dot product engine 210 is enabled and calculates the dot product of the inputs $x_0$, $x_1$, $x_2$ and the first set of weights $w'_0$, $w'_1$, $w'_2$, whilst the second dot product engine 230 is also enabled, but receives only an MSB portion comprising one or more most significant bits of each input $x_0$, $x_1$, $x_2$, and so calculates the dot product of the MSBs of the inputs $x_0$, $x_1$, $x_2$ and the second set of weights $w'_0$, $w'_1$, $w'_2$. If the first set of weights is selected to represent the MSBs of a set of weights W intended to be applied to the set of inputs and the second set of weights is selected to represent the LSBs of the set of weights intended to be applied to the set of inputs, then the combined dot product output by the neuron 300 will be a higher accuracy representation of the dot product of the set of weights W and the set of input signals than the combined dot product output in the second mode, but lower accuracy than the combined dot product output in the first mode.

Such an arrangement may be beneficial, for example, where the neuron is implemented on an integrated circuit for performing neural net functions in an edge device such as a mobile telephone, tablet computer or the like. Such a neural net may be used as a part of an on-device inference system for use in an always-on applications such as an always-on audio monitoring system.

In such an application, the first dot product engine 210 may always be enabled and the second dot product engine 230 may usually be disabled, so as to reduce the power consumption of the integrated circuit implementing the neuron 300, at a cost of reduced accuracy in the processing of input audio signals, as compared to the case where both the first dot product engine 210 and the second dot product engine 230 are enabled.

If such low-accuracy processing of input audio signals results in the detection of an audio signal that could be of interest, e.g. an audio signal that could represent a first part of a spoken command intended to cause the device to perform some function, then the second dot product engine 230 could be enabled to permit processing of subsequent input audio signals with greater accuracy to determine whether the input audio signals are indeed of interest. In this way the power consumption of the neuron 300 can be reduced during an always-on passive "listening" phase, whilst still providing sufficient processing accuracy during an active "processing" phase to detect whether a received audio signal is of interest.

Figure 4:
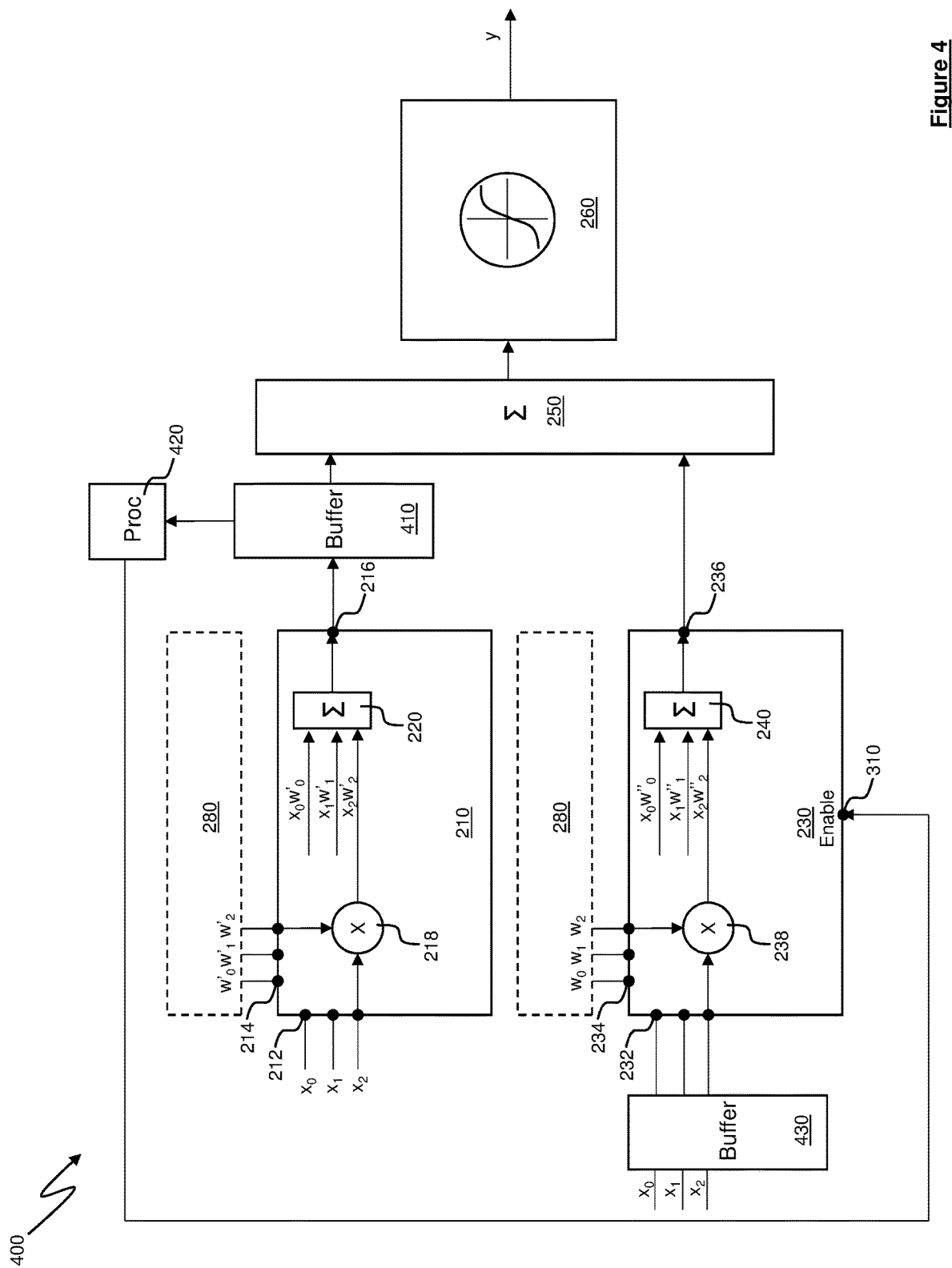
FIG. 4 is a schematic representation of a further example of an alternative neuron for an artificial neural network.

FIG. 4 is a schematic representation of a neuron in which a dot product engine can be selectively enabled in response to detection of an input that may be of interest. The neuron (shown generally at 400 in FIG. 4) is similar to the neuron 300 of FIG. 3, and thus like elements are denoted by like reference numerals.

The neuron 400 includes a first buffer 410, which is configured to receive the dot product output signal output by the first dot product engine 210 representing the result of the dot product calculation performed by the first dot product engine 210. The first buffer 410 is coupled to the combiner 250, so as to pass on the received dot product output signal to the combiner 250, and to a processing unit 420, which is operative to process the dot product output signal output by the first dot product engine 210 to assess whether this dot product output signal might represent a signal of interest, and to output an enable signal to the enable terminal 410 if it determines that the dot product output signal does indeed represent a signal of interest.

The neuron 400 further includes a second buffer 430, which is configured to receive the input signals $x_1$, $x_2$, $x_3$ and to output the input signals $x_1$, $x_2$, $x_3$ to the second dot product engine 230 if the processing unit 420 determines that the first dot product output signal output by the first dot product engine 210 represents a signal of interest, as will be explained below.

In operation of the neuron 400, the second dot product engine 230 is usually disabled so as to minimise the power consumption of the neuron 400. The first dot product engine 210 processes the input signals as described above, and outputs a first dot product output signal representing the result of the dot product calculation performed by the first dot product engine 210 to the buffer 410. The processing unit 420 retrieves the dot product output signal from the buffer 410 and processes it as described above to determine if the output signal represents a signal of interest. If so, the processing unit 420 outputs an enable signal to the enable terminal 310 to enable the second dot product engine 230.

The input signals stored in the second buffer 430 are then processed by the second dot product engine 230, which outputs a second dot product output signal to the combiner 250, which combines the first and second dot product output signals to generate a combined dot product output signal that is output to the activation function unit 260 as described above.

Subsequent input signals are then processed by both the first and second dot product engines 210, 230 as described above with reference to FIG. 2. The processing unit 420 may continue to process the output signals output by the first dot product engine 210 to determine when those output signals no longer represent a signal of interest, at which point the processing unit 420 may output a disable signal to the enable terminal 310 of the second dot product engine 230 so as to disable the second dot product engine 230.

In an alternative embodiment the first buffer 410 could be omitted, the outputs of the second buffer could be coupled to the inputs of both the first and second dot product engines 210, 230 and the processing unit 420 could receive the first dot product output signal directly from the output terminal 216 of the first dot product engine 210. Then, if the processing unit 420 determines that the first dot product output signal output by the first dot product engine 210 represents a signal of interest, the second dot product engine 230 is enabled and the buffered input signals are processed by both the first and second dot product engines 210, 230.

Alternatively, both the first and second buffers 410, 430 could be omitted and the processing unit 420 could receive the first dot product output signal directly from the output terminal 216 of the first dot product engine 210. Then, if the processing unit 420 determines that the first dot product output signal output by the first dot product engine 210 represents a signal of interest, the second dot product engine 230 is enabled and input signals received by the second dot product engine 230 after it has been activated are processed as described above. Under this scheme the samples of input signals that were processed by the first dot product engine 210 to generate the first dot product output signal determined by the processing unit 420 to represent a signal of interest will not be processed by the second dot product engine 230, but a subsequent set of samples (e.g. the next frame of data of a stream of frames of data) will be processed by the second dot product engine 230.

In this way, the power consumption of the neuron 400 can be minimised until such time as a signal of interest is detected, at which point greater processing accuracy is provided by enabling the second dot product engine 230.

Figure 5:
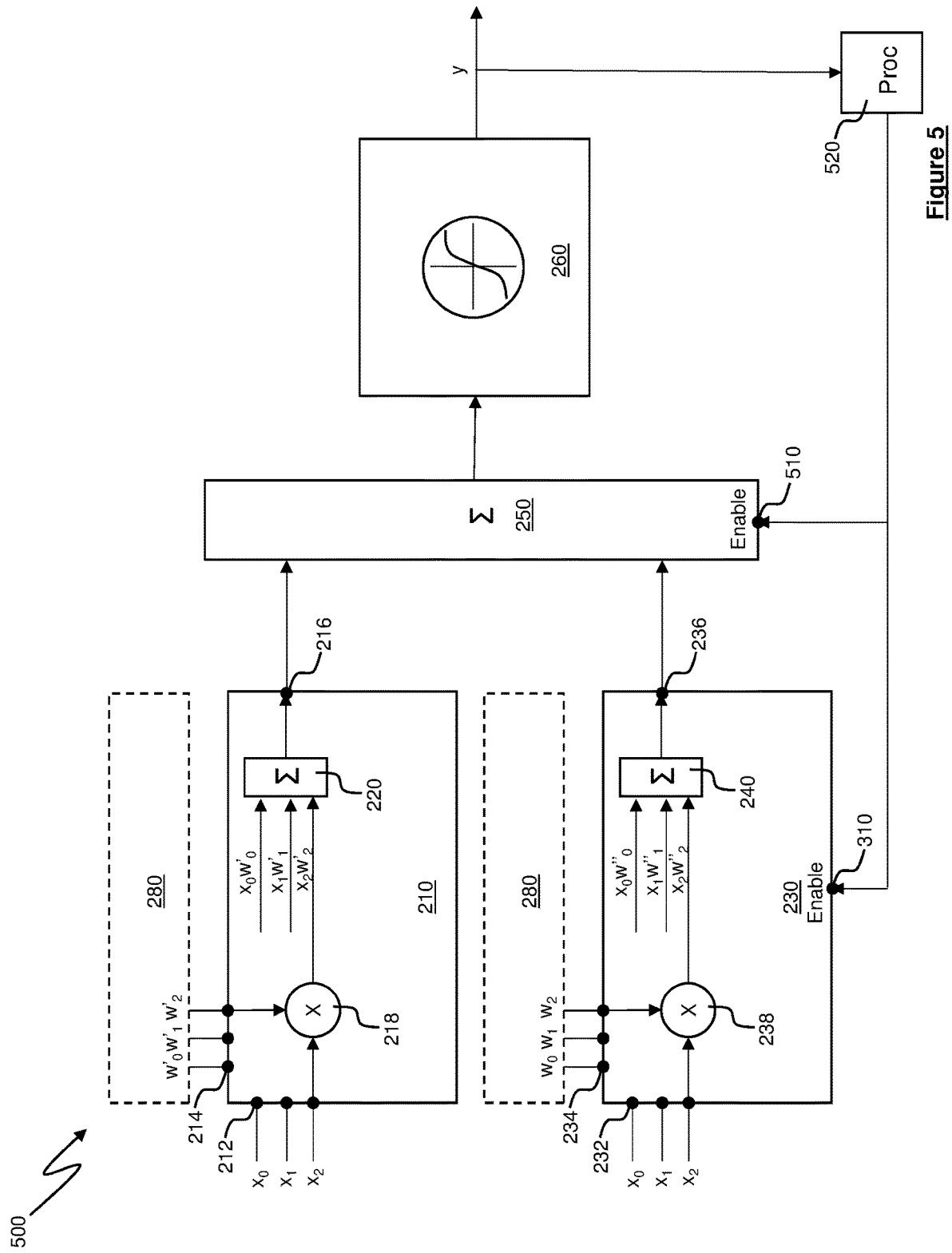
FIG. 5 is a schematic representation of a further example of an alternative neuron for an artificial neural network.

FIG. 5 is a schematic representation of an alternative neuron in which a dot product engine can be selectively enabled in response to detection of an input that may be of interest. The neuron (shown generally at 500 in FIG. 5) is similar to the neuron 300 of FIG. 3, and thus like elements are denoted by like reference numerals.

In the neuron 500, the combiner 250 includes an enable terminal 510 configured to receive an enable/disable signal. In response to receiving an enable signal at the enable terminal 510, the combiner 250 may be enabled whereas in response to receiving a disable signal at the enable terminal 510, the combiner 250 may be disabled. The neuron 500 further includes a processing unit 520 configured to receive and process the signal y output by the non-linear function unit 260.

In operation of the neuron 500, the combiner 250 is usually disabled, and thus acts as a simple pass-through for signals received at its inputs. The second dot product engine 230 is also usually disabled. Disabling the combiner and second dot product engine 230 has the effect of minimising or at least reducing the power consumption of the neuron 500. In this state, the non-linear function unit 360 receives only the output signals output by the first dot product engine 210 representing the result of the dot product calculation performed by the first dot product engine 210. The processing unit 520 is operative to process the signal y output by the non-linear function unit 360 to assess whether this signals might represent a signal of interest, and to output an enable signal to the enable terminal 310 of the second dot product engine 230 and the enable terminal 510 of the combiner 250 if it determines that the output signal y does indeed represent a signal of interest. Subsequent input signals are then processed by both the first and second dot product engines 310, 320, and the signals output by the first and second dot product engines 310, 320 are combined as described above and output to the non-linear function unit 360. The processing unit 520 may continue to process the output signal output by the non-linear processing unit (which now include a contribution from the second dot product engine 230) to determine when that output signal no longer represents a signal of interest, at which point the processing unit 520 may output disable signals to the enable terminals 310, 510 of the second dot product engine 230 and the combiner 250 so as to disable the second dot product engine 230 and the combiner 250.

In this way, the power consumption of the neuron 500 can be minimised or at least reduced until such time as a signal of interest is detected, at which point greater processing accuracy is provided by enabling the second dot product engine 230 and combiner 250.

Figure 6:
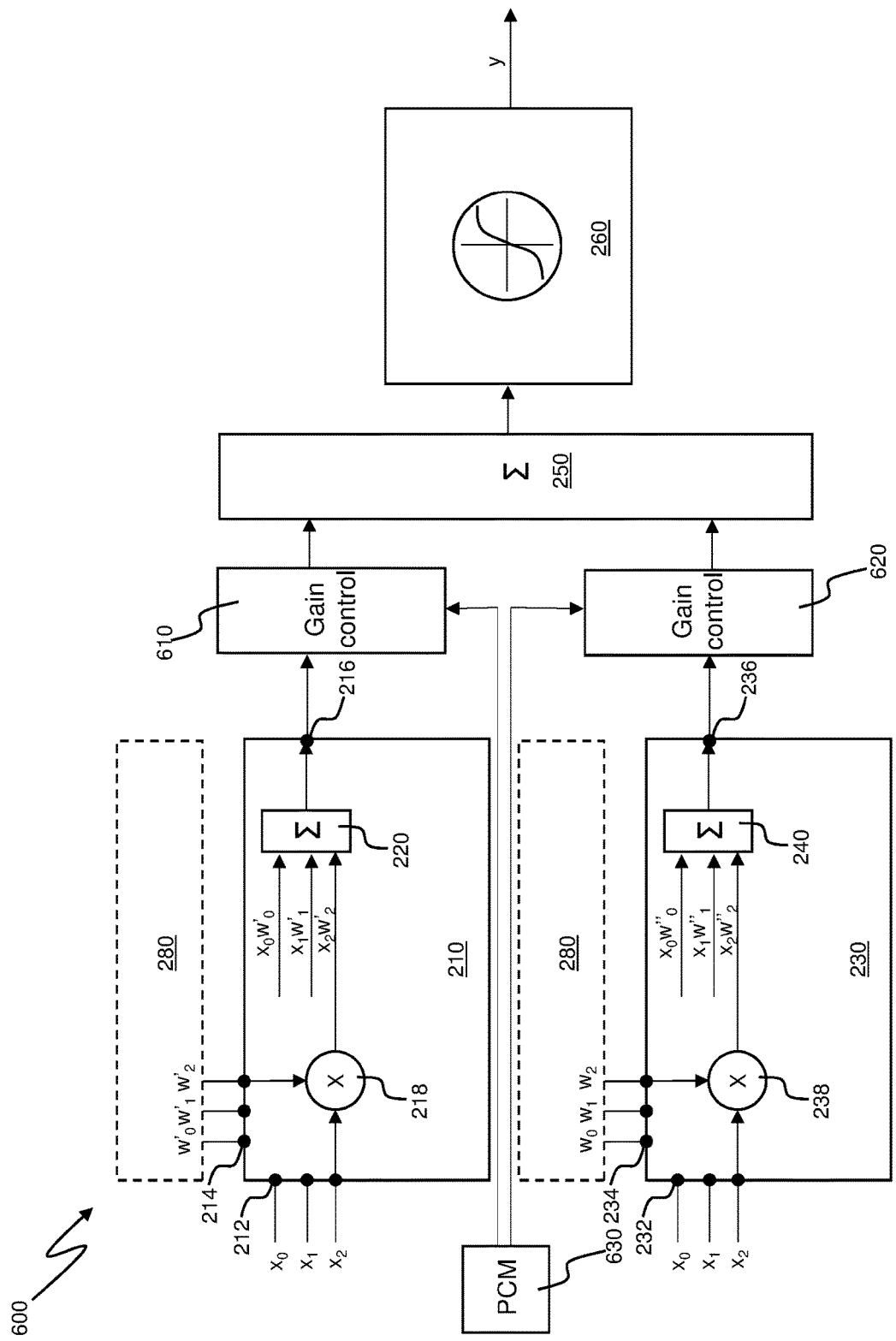
FIG. 6 is a schematic representation of a further example of an alternative neuron for an artificial neural network.

FIG. 6 is a schematic representation of an alternative neuron in which a first dot product engine is an analog dot product engine and a second dot product engine is a digital dot product engine. The neuron (shown generally at 600 in FIG. 6) is similar to the neuron 200 of FIG. 2, and thus like elements are denoted by like reference numerals.

In the neuron 600, the first dot product engine 210 is an analog dot product engine, i.e. its computation elements 318 are analog computation elements, whilst the second dot product engine 230 is a digital dot product engine, i.e. its computation elements 238 are digital computation elements.

The neuron 600 operates in the same manner as the neuron 200 described above. However, because the first dot product engine 210 is an analog dot product engine and the second dot product engine 230 is a digital dot product engine, it is possible that there could be differences or variations between the gains of the first dot product output signal output by the first dot product engine 210 and the second dot product output signal output by the second dot product engine 230. Such variations or differences could arise, for example, from process variations in the fabrication of the first and second dot product engines 210, 230, differences or variations in the voltages of the signals output by the first and second dot product engines 210, 230, temperature variations between the first and second dot product engines 210, 230 or even mechanical stress in an integrated circuit in which the first and/or second dot product engines 210, 230 are provided. These differences or variations in the gains of the first and second dot product output signals could adversely affect the outputs of the neuron 600 if propagated to the combiner 250.

To mitigate this risk the neuron 600 may be provided with a first gain control unit 610 coupled to the outputs of the first dot product engine 210 and/or a second gain control unit 520 coupled to the outputs of the second dot product engine 230. The first gain control unit 610 (where provided) is operative to apply a controllable gain to the signals output by the analog dot product engine 210 and to output the gain-modified versions of the output signals to the combiner 250. Similarly, the second gain control unit 620 (where provided) is operative to apply a controllable gain to the signals output by the digital dot product engine 230 and to output the gain-modified versions of the output signals to the combiner 250. A process control monitor unit 630 is provided, which is configured to monitor the signals output by the first and second dot product engines 210, 230 and to output control signals to the first and/or second gain control units 610, 620 to control the gain(s) applied to the dot product output signals output by the first and/or second dot product engines 210, 230, so as to minimise or reduce any difference or variation between the gains of the signals received at the combiner 250, thereby reducing the risk of errors caused by such differences or variations in gain.

As will be appreciated by those skilled in the art, digital computation is less prone to errors than analog computation, as digital computation elements are less sensitive to noise than analog computation elements. However, in general digital computation elements consume more power than analog computation elements, and thus the use of large numbers of digital computation elements in a processing system implemented in an integrated circuit of, e.g., an edge device, is undesirable from a power management point of view. The use of an analog dot product engine as the first dot product engine 210 and a digital dot product engine as the second dot product engine 230 in the processing system 600 enables a balance to be struck between power consumption and computational accuracy.

The processing system 600 may be configured such that either the first or second dot product engine 210, 230 can be selectively enabled or disabled, by providing the first or second dot product engine 210, 230 and optionally the combiner 250 with an enable terminal and optionally providing a processing unit configured to process the output signals output by one of the first and second dot product engines 210, 230 in order to determine whether the other of the first and second dot product engines 210, 230 should be enabled, as described above with reference to FIGS. 3, 4 and 5.

Further, as discussed above, the first and second dot product engines 210, 230 may be configured to perform their respective computations on versions of the weights having different levels of quantisation. Thus, the first (analog) dot product engine 210 may be configured to multiply the input signals $x_0$, $x_1$, $x_2$ by, say, 4-bit signals representing the weights $w'_0$, $w'_1$, $w'_2$, whilst the second dot product engine 230 may be configured to multiply the input signals $x_0$, $x_1$, $x_2$ by, say, 6-bit signals representing the weights $w''_0$, $w''_1$, $w''_2$. Thus in this example the computations performed by the second dot product engine 230 may have a higher range or degree of accuracy than those performed by the first dot product engine 210, such that the results of the computations performed by the first dot product engine 210 can be used to provide a coarse approximation of the desired output of the processing system 300 and the results of the computations performed by the second dot product engine 230 can be used to refine the coarse approximation provided by the first dot product engine 210. Thus, the results of the computations performed by the second dot product engine 230 may be said to correct quantisation error introduced by the first dot product engine 210. Alternatively (or additionally), the second dot product engine 230 may compensate for analog process or mismatch errors, with the weights used by the second dot product engine 230 being determined, for example, during a calibration process that may be performed during manufacture or initialisation of a device that includes the neuron 600 or periodically in use of such as device, or as part of a continuous adaption process performed by the device.

As discussed above, a neural network typically includes a number of layers, and each layer includes a plurality of neurons. The present disclosure therefore extends to neural networks and layers of neural networks including a plurality of nodes 200, 300, 400, 500, 600 of the kind described above with reference to FIGS. 2-6.

The neurons 200, 300, 400, 500, 600 described above with reference to FIGS. 2-6 each implement a single vector dot product (VDP) operation, whose output is subject to a non-linear activation function. As discussed above, an artificial neural network includes at least two layers, each layer typically comprising a plurality of neurons. An ANN or a layer of an ANN can be implemented using a plurality of neurons 200, 300, 400, 500, 600 as will now be described with reference to FIG. 7.

Figure 7:
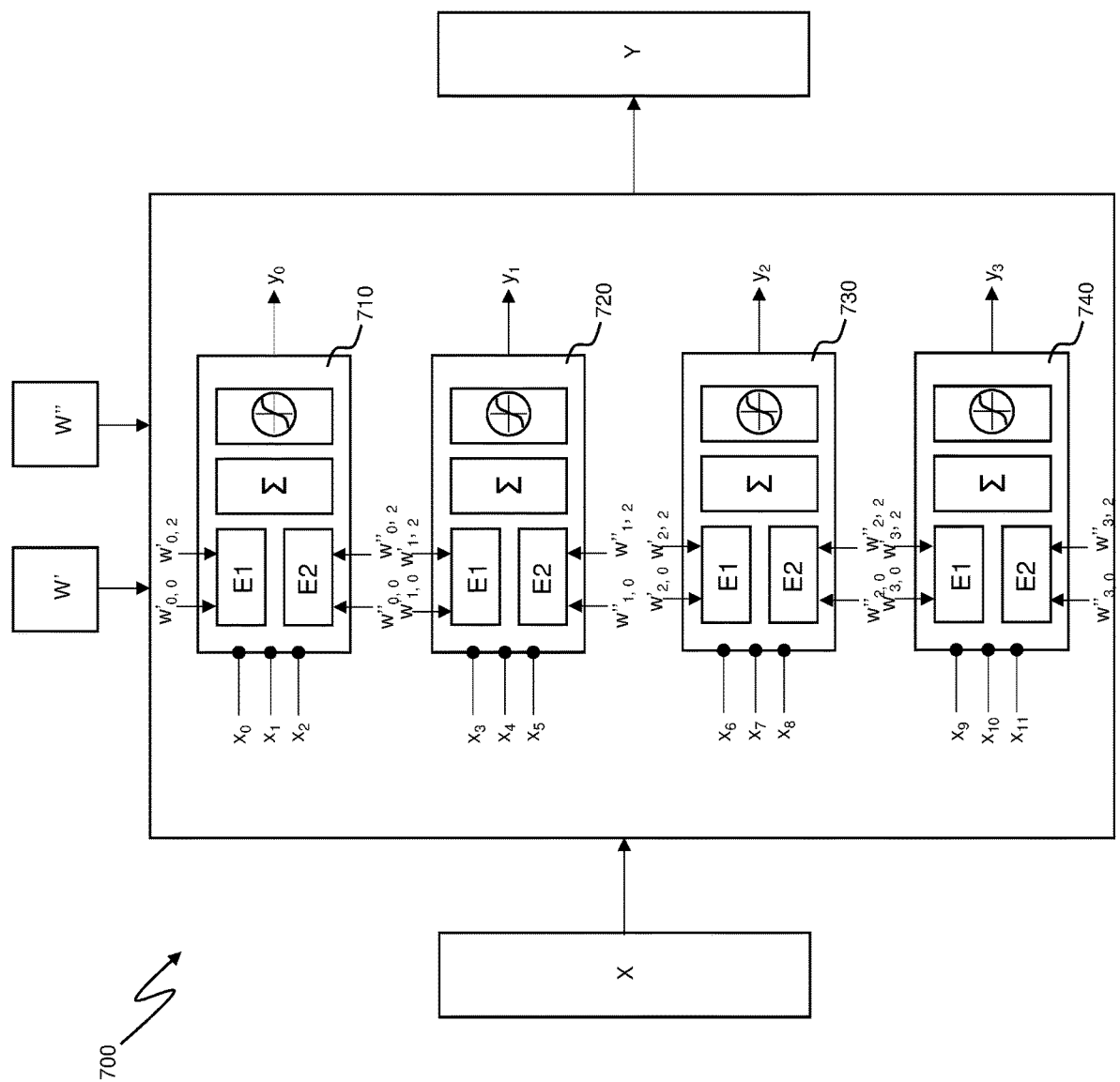
FIG. 7 is a schematic representation of an artificial neural network (ANN) system comprising a plurality of neurons.

FIG. 7 schematically illustrates an artificial neural network system 700 including a plurality (in this example 4) of neurons 710, 720, 730, 740. Each neuron 710, 720, 730, 740 is a neuron of the kind described above with reference to FIGS. 2-6, and thus each neuron includes first and second dot product engines, a combiner and an activation function unit as described above.

A first neuron 710 receives a set of inputs $x_0$, $x_1$, $x_2$, a first set of weights $w'_{0,0}$, $w'_{0,1}$, $w'_{0,2}$ and a second set of weights $w''_{0,0}$, $w''_{0,1}$, $w''_{0,2}$. A first dot product engine of the first neuron 710 calculates the dot product of the set of inputs and the first set of weights and outputs a first dot product to a combiner, whilst a second dot product engine calculates the dot product of the set of inputs and the second set of weights and outputs a second dot product to the combiner. The first and second dot products are combined to generate a combined dot product, to which an activation function is applied as described above to generate a first neuron output $y_0$.

A second neuron 720 receives a set of inputs $x_3$, $x_4$, $x_5$, a first set of weights $w'_{1,0}$, $w'_{1,1}$, $w'_{1,2}$ and a second set of weights $w''_{1,0}$, $w''_{1,1}$, $w''_{1,2}$. A first dot product engine of the second neuron 720 calculates the dot product of the set of inputs and the first set of weights and outputs a first dot product to a combiner, whilst a second dot product engine calculates the dot product of the set of inputs and the second set of weights and outputs a second dot product to the combiner. The first and second dot products are combined to generate a combined dot product, to which an activation function is applied as described above to generate a second neuron output $y_1$.

A third neuron 730 receives a set of inputs $x_6$, $x_7$, $x_8$, a first set of weights $w'_{2,0}$, $w'_{2,1}$, $w'_{2,2}$ and a second set of weights $w''_{2,0}$, $w''_{2,1}$, $w''_{2,2}$. A first dot product engine of the third neuron 730 calculates the dot product of the set of inputs and the first set of weights and outputs a first dot product to a combiner, whilst a second dot product engine calculates the dot product of the set of inputs and the second set of weights and outputs a second dot product to the combiner. The first and second dot products are combined to generate a combined dot product, to which an activation function is applied as described above to generate a third neuron output $y_2$.

A fourth neuron 740 receives a set of inputs $x_9$, $x_{10}$, $x_{11}$, a first set of weights $w'_{3,0}$, $w'_{3,1}$, $w'_{3,2}$ and a second set of weights $w''_{3,0}$, $w''_{3,1}$, $w''_{3,2}$. A first dot product engine of the fourth neuron 740 calculates the dot product of the set of inputs and the first set of weights and outputs a first dot product to a combiner, whilst a second dot product engine calculates the dot product of the set of inputs and the second set of weights and outputs a second dot product to the combiner. The first and second dot products are combined to generate a combined dot product, to which an activation function is applied as described above to generate a fourth neuron output $y_3$.

The inputs $x_0$-$x_{11}$, may be provided as or derived from a vector of input values, whilst the first sets of weights for each dot product engine of each neuron 710, 720, 730, 740 may be provided as or derived from a single weight matrix W'. For example, a weight matrix W' may include a first row comprising the weights $w'_{0,0}$, $w'_{0,1}$, $w'_{0,2}$ a second row comprising the weights $w'_{1,0}$, $w'_{1,1}$, $w'_{1,2}$ a third row comprising the weights $w'_{2,0}$, $w'_{2,1}$, $w'_{2,2}$ and a fourth row comprising the weights $w'_{3,0}$, $w'_{3,1}$, $w'_{3,2}$. Similarly, the second sets of weights for each dot product engine of each neuron 710, 720, 730, 740 may be provided as or derived from a single weight matrix W". For example, a weight matrix W" may include a first row comprising the weights $w''_{0,0}$, $w''_{0,1}$, $w''_{0,2}$ a second row comprising the weights $w''_{1,0}$, $w''_{1,1}$, $w''_{1,2}$ a third row comprising the weights $w''_{2,0}$, $w''_{2,1}$, $w''_{2,2}$ and a fourth row comprising the weights $w''_{3,0}$, $w''_{3,1}$, $w''_{3,2}$.

Thus, the dot product engines of the neurons 710, 720, 730, 740 collectively perform the vector-matrix multiplication V=W'X+W"X, where V is a vector of the outputs of the combiners of the neurons 710, 720, 730, 740, W' is the first matrix of weights, W" is the second matrix of weights and X is the vector of input values. The activation function units of the neurons 710, 720, 730, 740 collectively output a vector Y of neuron output values. In some embodiments there may be partial or complete overlap of the input vector X components, i.e. one or more components of X may be provided as inputs to more than one dot product engine.

As will be appreciated, the dot product engines of the neurons 710, 720, 730, 740 can also collectively perform a multiplication of an input matrix by a matrix of weights.

More generally, it can be said that the dot product engines of the neurons 710, 720, 730, 740 collectively perform a tensor multiplication V=W'X+W"X of an input tensor X with two tensors W' and W" to generate an output tensor V, and that the activation function units of the neurons 710, 720, 730, 740 collectively output a tensor Y of neuron output values.

In the example shown in FIG. 7 the artificial neural network system 700 includes four neurons 710, 702, 730, 740, each performing computations on sets of three inputs with sets of three first weights and three second weights. It will be appreciated, however, that an artificial neural network system may comprise any number of neurons or layers of neurons, each performing computations on sets of inputs containing any number of inputs and first and second sets of weights containing numbers of weights corresponding to the number of inputs received by the neuron.

Figure 8:
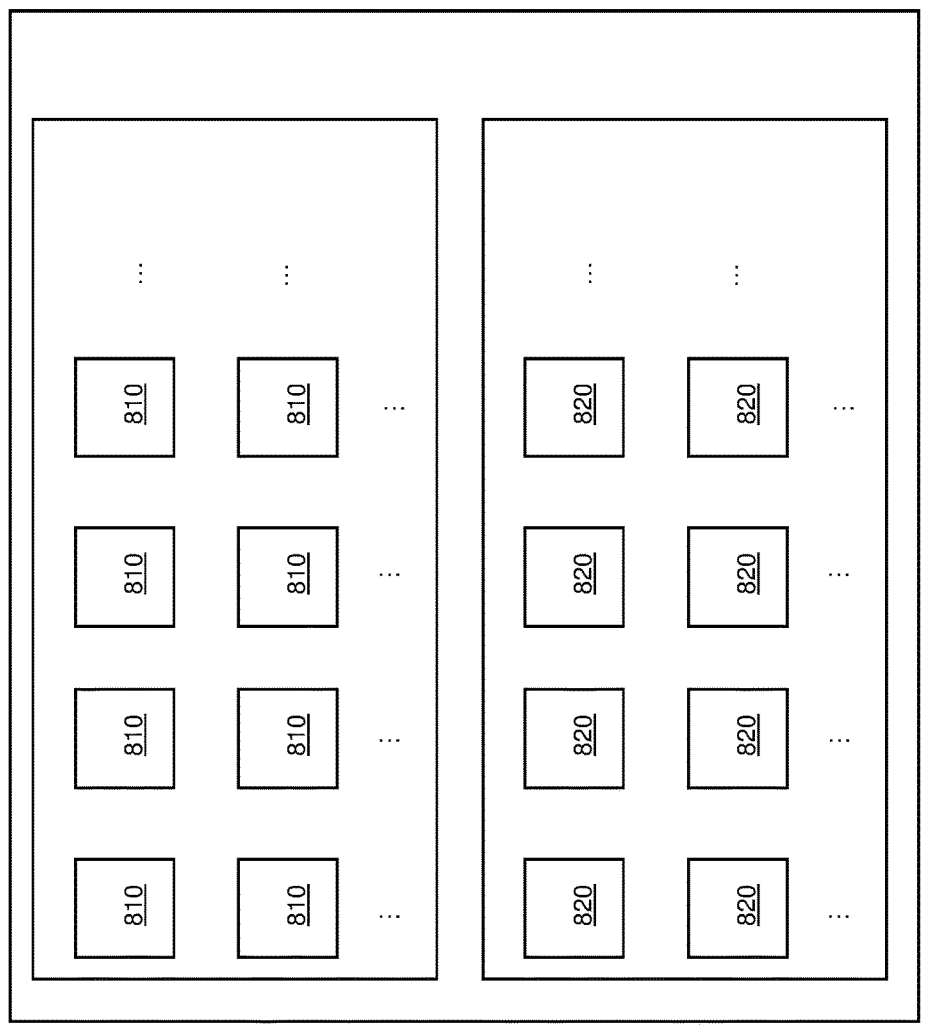
FIG. 8 is a schematic representation of an ANN system including a plurality of computing tiles.

FIG. 8 is a schematic representation of a distributed architecture of an artificial neural network system suitable for implementing a deep (i.e. multi-layer) neural network (DNN) with variable precision. The artificial neural network system, shown generally at 800 in FIG. 8, comprises a first array containing a plurality of computing tiles 810 of a first type and a second first array containing a plurality of computing tiles 820 of a second type that is different than the first type. Each tile 810 of the first array implements one or more vector dot product operations, and each tile of the second array also implements one or more vector dot product operations. Each tile 810, 820 may comprise a single dot product engine as described above with reference to FIG. 2, or may comprise two dot product engines and a combiner, as described above with reference to FIGS. 3-6. The tiles may be analog tiles, i.e. they may comprise analog computation elements to perform their computations. Alternatively, the tiles may be digital tiles, i.e. they may comprise digital computation elements to perform their computations. As a further alternative, a mixture of analog and digital tiles may be provided. For example, all of the tile 810 of the first array may be analog tiles, and all of the tiles of the second array 820 may be digital tiles. Additionally or alternatively the tiles 810 may be configured to perform a different function than the tiles 820. For example, the tiles 810 may be configured to perform a one-bit dot product operation, whilst the tiles 820 may be configured to perform a four-bit dot product operation.

A bus architecture (not shown in FIG. 8) is provided to permit the tiles 810, 820 to be connected together in different permutations so as to create an artificial neural network of a desired precision or resolution, as will be described in more detail below with reference to FIG. 9.

The weights for each tile may have a fixed precision or resolution of a predetermined number of bits, and each tile has a plurality of inputs. In general, the system 800 may include a plurality of tiles of a first precision level or resolution of, e.g. N bits precision (i.e. tiles whose weights are N-bit numbers) and a plurality of tiles of a second precision level or resolution of, e.g. M bits (i.e. tiles whose weights are M-bit numbers), where N≠M. The plurality of tiles of the first precision level or resolution may be arranged in a first array. Similarly, the plurality of tiles of the second precision level or resolution may be arranged in a second array. The plurality of tiles of the first array may be analog tiles, such that the first array is an analog array, and the plurality of tiles of the second array may be digital tiles, such that the second array is a digital array. Tiles of the first array may be structurally or functionally different from tiles of the second array.

The system 800 permits the output of a VDP of a tile of one precision level or resolution to be combined with the output of a VDP of a tile of a different precision level or resolution in order to generate a combined output of increased precision or resolution, as compared to the output of a single tile alone. For example, the result of a VDP performed by a first, relatively lower-precision, N-bit tile can be augmented with the result of a VDP performed by a second, relatively higher-precision, M-bit tile in order to generate an enhanced precision combined VDP result, which can be output to an activation function unit of the first tile to generate a tile output of enhanced precision or resolution. In this example, the VDP result of the second tile undergoes a bitwise right-shift operation and is then accumulated with the VDP result of the first tile to generate the combined VDP result. One or more additional VDP results from additional tiles can be added to the combined VDP result in the same manner, if necessary or desired, before the resulting combined VDP result (containing contributions from the first tile, the second tile and any additional tiles) is output to the activation function.

Figure 9:
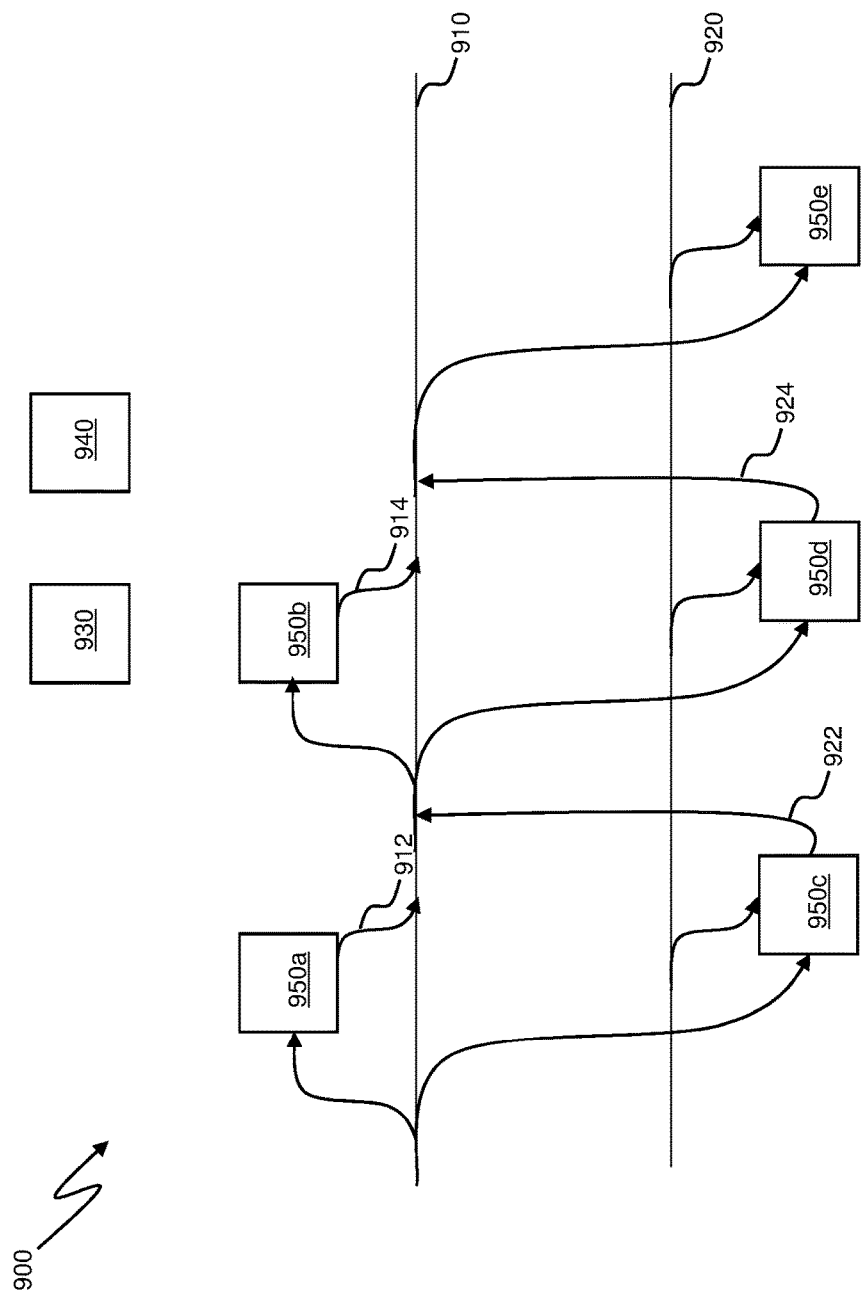
FIG. 9 is a schematic representation of a bus architecture for an ANN system of the kind shown in FIG. 8.

FIG. 9 is a schematic representation of a bus architecture for implementing a system of the kind described above. The bus architecture 900 of FIG. 9 includes a first data bus 910 and a second data bus 920, but in other examples only a single data bus may be provided. The bus architecture 900 is configurable, by means of a combiner such as digital recombination logic 930 coupled to the data buses 910, 920, to combine the output of any tile, or of a dot product engine of any tile, to the input of any other tile, so that VDP results from different tiles, including tiles of different precision levels or resolutions, can be combined to generate combined VDP results and dot product outputs having a desired resolution or precision level. A controller 940 is also coupled to the data buses 940 to control the switching of the data buses 910, 920 so as to selectively couple inputs and outputs of tiles 950a-950e to the data buses 910, 920 in order to implement an artificial neural network of a desired resolution or level of precision.

In the example illustrated in FIG. 9, the first bus 910 receives input data that is passed by the first bus 910 to a first tile 950a. The bus architecture 900 is configured such that a first VDP 912 generated by the first tile 950a (i.e. the output of a dot product engine of the first tile 950a, rather than the output of the activation function of the first tile 950a) is loaded onto the first bus 910, and is subsequently input to a second tile 950b.

The input data is also received at a third tile 950c, which generates a tile output 922 which is loaded onto the first bus 910 and is received by the second tile 810b. The second tile calculates a dot product output 914 based on the input data input to the bus 910, the VDP 912 output by the first tile 950a, and the output of the third tile 950c. The dot product output 914 is loaded onto the first bus 910 and is subsequently received by a fifth tile 950e.

The VDP 912 output by the first tile 950a is also received by a fourth tile 950d, which generates a tile output 924 that is loaded onto the first bus and is subsequently received by the fifth tile 950e. The fifth tile 950e thus generates a dot product based on the tile output 924 and the VDP output 914.

Thus, bus architecture permits the combination of VDPs and tile outputs from different tiles to be combined to generate an output of a desired level of precision. It will be appreciated that the tiles 910a-910e may each be a tile 810 or a tile 820 of the kind described above.

As will be apparent from the discussion above, the neurons 200, 300, 400, 500, 600, the ANN systems 700, 800 and the bus architecture 900 can be used in the implementation of an artificial neural network or an artificial neural network (or part of an ANN, such as a layer of an ANN) in hardware such as in an integrated circuit that may form part of an edge device such as a mobile telephone, tablet or laptop computer, Internet of Things (IoT) device or the like.

Figure 10:
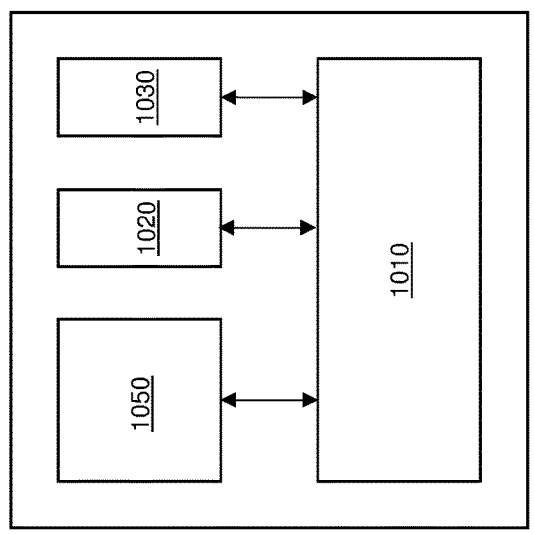
FIG. 10 is a schematic representation of a device incorporating a neuron, ANN system or bus architecture of the kind shown in FIGS. 3-9.

FIG. 10 is a schematic representation of a device in which a neuron, ANN system and/or bus architecture of the kind described above may be provided. The device, shown generally at 1000 in FIG. 10, may be an edge device such as a mobile telephone, tablet or laptop computer, IoT device or the like. The device 1000 includes a processing unit 1010, embodied on one or more integrated circuits, which may be, for example, an application processor. The device further includes memory 1020 communicatively coupled to the processing unit 1010, and a communications subsystem 1030 which is also communicatively coupled to the processing unit 1010 to permit the device 1000 to communicate with systems and devices external to the device 1000. The device 1000 further includes an integrated circuit 1050 that implements one or more neurons 200, 300, 400, 500, 600 or artificial neural network systems 700, 800 and/or bus architectures 900 of the kind described above with reference to FIGS. 2-9. The integrated circuit 1050 is communicatively coupled to the processing unit 1010 for receiving input data from and transmitting output data to the processing unit 1010.

As will be apparent from the discussion above, the first dot product engine 210 of the or each neuron of an artificial neural network system may be configured to generate result signals that provide a coarse approximation of the vector or tensor V, whilst the second dot product engine 230 of the or each neuron of the artificial neural network system may be configured to generate result signals that can be used to refine the coarse approximation of the vector or tensor V such that the result of the addition of the values represented by the output signals of the first and second dot product engines 210, 230, represents the tensor Y.

As described above, the dot product engines 210, 230 receive first and second sets of weight values respectively. These sets of weight values may be derived from a matrix decomposition of a matrix W (which represents the weights to be applied by the artificial neural network system to its inputs) into vectors W' and W" of weights to be applied by the dot product engines 210, 230.

The matrix W may be calculated at a central server or in the cloud, and the vectors W', W" may also be calculated at the central server or in the cloud and their respective weights provided to the or each neuron 200, 300, 400, 500, 600 of the ANN system (e.g. by download to memory 280 and/or programming of computation elements 218, 228) during manufacture of a device 1000 incorporating the ANN system or during a periodic or one-off update of the device 1000.

Figure 11:
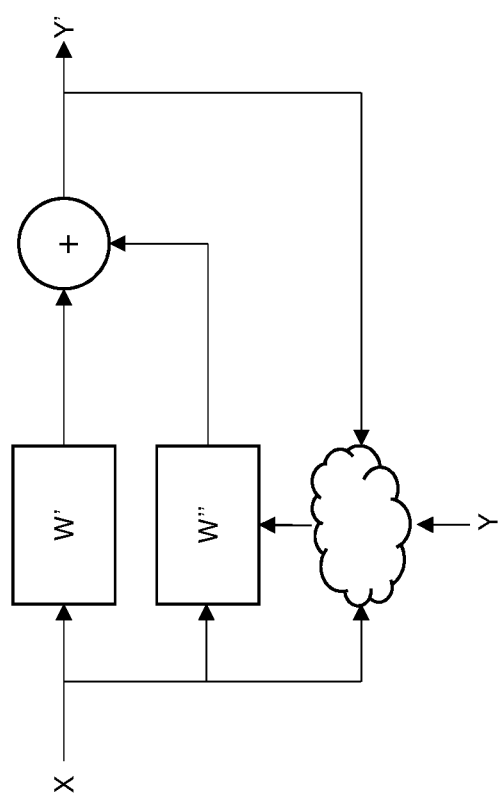
FIG. 11 conceptually illustrates a mechanism for learning weights for use by a dot product engine of the neurons of FIGS. 3-7.

Alternatively, the weights of the vector W' may calculated at a central server or in the cloud and may be provided to the neurons 200, 300, 400, 500, 600 of the ANN system (e.g. by download to memory 280 and/or programming of computation elements 218, 228) during manufacture of a device 1000 incorporating the ANN system or during a periodic or one-off update of the device 1000 and the weights W" may be computed or updated by the device 1000 itself, using a learning mechanism of the kind illustrated in FIG. 11. W" is calculated to minimise the error between the expected output Y and the actual output Y'.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A neuron for implementing a single vector dot product operation for an artificial neural network, the neuron comprising:
    a first dot product engine comprising a first plurality of computation elements operative to:
        receive a first set of weight signals;
        receive a set of input signals; and
        process the first set of weight signals and the set of input signals to generate a first dot product engine output signal;
    a second dot product engine, separate and distinct from the first dot product engine, the second dot product engine comprising a second plurality of computation elements operative to:
        receive a second set of weight signals;
        receive the set of input signals; and
        process the second set of weight signals and the set of input signals to generate a second dot product engine output signal; and
    a combiner operative to process the first dot product engine output signal and the second dot product engine output signal to generate a combined output signal,
    the neuron further comprising an activation function module arranged to apply an activation function to the combined output to generate a neuron output signal;
    wherein:
        the first set of weight signals represents a first set of weights to be applied by the first dot product engine;
        the second set of weight signals represents a second set of weights to be applied by the second dot product engine;
        the set of input signals represents a common set of inputs to be processed by both the first dot product engine and the second dot product engine;
        the first dot product engine output signal represents a first dot product of the common set of inputs and the first set of weights calculated by the first dot product engine; and
        the second dot product engine output signal represents a second dot product of the common set of inputs and the second set of weights calculated by the second dot product engine.

2. A neuron according to claim 1 wherein the second dot product engine is selectively operable.

3. A neuron according to claim 2 wherein the second dot product engine is selectively operable based on the first dot product engine output.

4. A neuron according to claim 3 further comprising a processing unit operable to process the first dot product engine output signal and to output an enable signal to the second dot product engine if the processing unit determines, based on the processing of the first dot product engine output, that the second dot product engine should be enabled.

5. A neuron according to claim 4 wherein the combiner is selectively operable, and wherein the processing unit is operable to output an enable signal to the combiner if the processing unit determines, based on the processing of the first dot product engine output signal, that the second dot product engine should be enabled.

6. A neuron according to claim 1 wherein the first and second dot product engines are analog dot product engines or wherein the first dot product engine is an analog dot product engine and the second dot product engine is a digital dot product engine.

7. A neuron according to claim 6 further comprising a process control monitor operative to monitor the first dot product engine output signal and the second dot product engine output signal and to apply a gain to one or both of the first dot product engine output signal and the second dot product engine output signal to compensate for gain variation or difference between the first dot product engine output signal and the second dot product engine output signal.

8. A neuron according to claim 1 wherein the first dot product engine has a first output signal range and the second dot product engine has a second output signal range, wherein the second output signal range is larger than the first output signal range.

9. A neuron according to claim 1 wherein the first and second sets of weights are derived from a master set of weights intended to be applied to the inputs, wherein each weight of the first set of weights represents one or more most significant bits (MSBs) of a corresponding weight of the master set of weights and each weight of the second set of weights represents one or more least significant bits (LSBs) of the corresponding weight of the master set of weights.

10. A neuron according to claim 9 wherein:
    the second dot product engine is selectively operable to calculate the dot product of one or more most significant bits of each input of the set of inputs and the second set of weights to generate the second dot product engine output.

11. A neuron according to claim 1 wherein the second dot product engine is configured to implement a trimming function or a calibration function for the first dot product engine.

12. A neuron according to claim 1 wherein the weights of the second set of weights have a different quantisation level than the weights of the first set of weights.

13. A neuron according to claim 12 wherein the second dot product engine is configured to correct quantisation error of the first set of weights used by the first dot product engine.

14. A neuron according to claim 1 wherein the first and second dot product engines are structurally or functionally different from each other.

15. A neuron for implementing a single vector dot product operation for an artificial neural network, the neuron comprising:
    an analog dot product engine comprising a first plurality of analog computation elements operative to:
        receive a first set of weight signals;
        receive a set of input signals; and
        process the first set of weight signals and the set of input signals to generate an analog dot product engine output signal;
    a digital dot product engine, separate and distinct from the analog dot product engine, the second dot product engine comprising a second plurality of digital computation elements operative to:
  receive a second set of weight signals;
  receive the set of input signals; and
  process the second set of weight signals and the set of input signals to generate a digital dot product engine output signal; and
a combiner operative to process the analog dot product engine output and the digital dot product engine output signal to generate a combined output signal,
the neuron further comprising an activation function module arranged to apply an activation function to the combined output signal to generate a neuron output signal;
wherein:
  the first set of weight signals represents a first set of weights to be applied by the analog dot product engine;
  the second set of weight signals represents a second set of weights to be applied by the digital dot product engine;
  the set of input signals represents a common set of inputs to be processed by both the analog dot product engine and the digital dot product engine;
  the analog dot product engine output signal represents a first dot product of the common set of inputs and the first set of weights calculated by the analog dot product engine; and
  the digital dot product engine output signal represents a second dot product of the common set of inputs and the second set of weights calculated by the digital dot product engine.

16. An integrated circuit comprising a neuron according to claim 1.

* * * * *